United States Patent [19]

Tokairin et al.

[11] Patent Number: 5,151,291
[45] Date of Patent: Sep. 29, 1992

[54] GLYCERIDES OF EICOSAPENTAENOIC ACID, PROCESSES FOR PREPARING THE SAME AND OIL AND FAT PRODUCTS CONTAINING THE SAME

[75] Inventors: Shigeru Tokairin, Tokyo; Tetsuo Nishimaki, Nagano, both of Japan

[73] Assignees: Nisshin Flour Milling Co., Ltd.; Tsukishima Foods Co., Ltd., both of Tokyo, Japan

[21] Appl. No.: 465,564

[22] Filed: Jan. 16, 1990

Related U.S. Application Data

[63] Continuation of Ser. No. 394,246, Aug. 15, 1989, abandoned, which is a continuation of Ser. No. 945,847, Dec. 23, 1986, abandoned.

[30] Foreign Application Priority Data

Dec. 27, 1985 [JP] Japan ................................. 60-292952

[51] Int. Cl.⁵ ...................... A23C 15/12; A23D 7/00; A23D 9/00
[52] U.S. Cl. .................... 426/581; 426/583; 426/585; 426/601; 426/602; 426/603; 426/604; 426/605; 426/606; 426/607; 426/611; 554/163; 554/169; 554/224
[58] Field of Search ............... 260/412.2, 410.7, 428.5; 426/581, 602, 603, 605, 607, 604, 606, 611, 583, 585; 394/296

[56] References Cited

U.S. PATENT DOCUMENTS 2,822,348  2/1958  Hasham ..................... 260/410.7 X
4,377,526  3/1983  Fujita et al. ................ 260/428.5 X

FOREIGN PATENT DOCUMENTS 67241  4/1984  Japan ............................... 260/428.5
43143  3/1986  Japan ............................... 260/410.7

Primary Examiner—Vivian Garner
Attorney, Agent, or Firm—Abelman Frayne & Schwab

[57] ABSTRACT

Glycerides of eicosapentaenoic acid (EPA) and other higher fatty acids, which contain high levels of EPA and docosahexaenoic acid. These glycerides are incorporated in oils and fats products such as margarine, shortening, mayonnaise, butter, dressing or edible oil.

3 Claims, No Drawings

GLYCERIDES OF EICOSAPENTAENOIC ACID, PROCESSES FOR PREPARING THE SAME AND OIL AND FAT PRODUCTS CONTAINING THE SAME

This application is a continuation of application Ser. No. 394,246, filed Aug. 15, 1989, now abandoned, which is a continuation of application Ser. No. 945,847, filed Dec. 23, 1986, now abandoned.

BACKGROUND OF THE INVENTION

This invention relates to glycerol esters (glycerides) of eicosapentaenoic acid which is hereafter abbreviated as "EPA", processes for preparing the same and oil and fat products containing the same.

As one of fatty acids in fish oil, EPA abundantly exists in the natural world. Highly unsaturated fatty acids such as EPA have been noted from the standpoint of the science of nutrition. In particular, since J. Dyerberg has reported in "The Lancet." July 15, 117 (1978) that the unsaturated fatty acids of the kind are effective for prevention of geriatric diseases, the study thereof has been made actively. Further, since the acids are known to play an important role in maintenance of life as starting materials of prostaglandins, application thereof to medicines and supplementary foods for promoting nutrition has come to be expanded.

As stated above. EPA exists as a fatty acid component of fish oils and the like in the natural world, and the EPA content in various fish oils is approximately 16.5% in krill oil, 15.8% in sardine oil. 12.6% in walleye pollack liver oil, 10.2% in cuttlefish oil, 8.1% in mackerel oil, 4.9% in saury oil and 5.6% in shark liver oil. There is a low temperature crystallization process as one of the processes for separating and purifying glycerides to which EPA is bonded from these oils (Japanese Patent Laid-Open-to-Public Nos. 59644/1984 and 67241/1984). According to this process, the glycerides having the EPA content of up to about 25% can be separated from the oils. There are also known separation and purification processes by chromatography, solvent extraction and molecular distillation. However, such processes result in the production of glycerides having the EPA content as low as about 30%.

Under the circumstances, it has been demanded in the art to obtain glycerides rich in EPA, since digestion and absorption of EPA are said &o be advantageously performable when EPA is present in glyceride form. However. There are not known glycerides having the EPA content of higher than 30%, particularly those to which only EFA has bonded.

The applicant has already disclosed in his own prior patent application (Japanese Patent Application No. 162849/1984) the glycerides having the EPA content of higher than 30% and processes for the preparation thereof. However, there is still left much room for study and development of such glycerides when used as fat and oil components of margarine in an effort to allow the margarine to solidify more easily.

As is already known, fish oils undergo autoxidation in the atmosphere to bring about a decrease in nutritive value and bad taste. Such is also the case with EPA containing fat and oil components obtained by concentration from fish oils and the like. This degradation phenomenon proceeds by free radical chain reaction, whereby hydroperoxide accumulates in fats and oils and decomposition products thereof form the cause of toxicity and unpleasant odor. On that account the use of fish oils of EPA containing fat and oil components is rather limited.

Now an interest has been evinced in the use as supplementary foods for nutrition of glycerides of EPA prepared by concentration from fish oils and also the use of said glycerides as food additives has been taken into consideration. However, no food products incorporated with the glycerides of EPA have been put to practical use.

As mentioned previously we have already proposed glycerides having a high bonding ratio of EPA and processes for preparing the same. In the glycerides of EFA prepared by these processes, however, acyl radical of lower fatty acids derived from the lower fatty acid triglycerides which are the starting material inevitably remains. Because of the presence of the acyl radical of lower fatty acids, the resulting glycerides of EFA are low in melting point. On that account, there was a problem when the resultant glycerides of EPA were used as raw materials for the preparation of solid type fat and oil product such as margarine, shortening, etc. Accordingly, there has been an increasing demand for glycerides of EPA which are higher in melting point, i.e., those which are readily subject to solidification.

DESCRIPTION OF THE INVENTION

Now, we have found that if glycerides high in the EPA content, preferably those to which only EPA has bonded, are prepared by reducing as minimum as possible amounts of impurities other than fats and oils, it is as a natural consequence to reduce the amount of EPA glycerides used in oils and fats products, thus achieving decreased nutritive value or deteriorated taste observed in fish oils concentrated products thereof as aforesaid, and also found that if, in the aforesaid processes developed by ourselves, glycerides of higher fatty acid are substituted for those of the lower fatty acid for ester interchange with the lower alkyl esters of EPA, there can be prepared glycerides which contain EPA in high concentration and have high melting points. Based on the above findings, we conducted ester interchange between lower alkyl esters of EPA and glycerides of higher fatty acid and were successful in preparing excellent products containing EPA in high concentration and having high melting points with good taste.

According to the present invention there is provided glycerides of EPA represented by the following formula and processes for the preparation thereof.

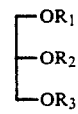

wherein $R_1$, $R_2$ and $R_3$, which are the same or different, each represent eicosapentaenoyl group or an acyl radical of higher fatty acids other than EPA, provided that at least one of $R_1$, $R_2$ and $R_3$ represents eicosapentaenoyl group.

The term "higher fatty acids" as used herein refers to saturated and unsaturated fatty acids containing more than 14 carbon atoms. Representative examples of higher fatty acids include myristic acid, palmitic acid, palmitoleic acid, stearic acid, oleic acid, linoleic acid, linolenic acid, parinaric acid, arachic acid, gadoleic acid, arachidonic acid, eicosapentaenoic acid, behenic acid, docosahexaenoic acid and the like.

The glycerides of EPA according to the present invention can be prepared by subjecting glycerides of the formula

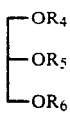

wherein $R_4$, $R_5$ and $R_6$, which are the same or different, each represent an acyl radical of higher fatty acids, and alkyl esters of EPA to ester interchange reaction.

To prepare the lower alkyl esters of EPA used in the present invention, a purified sardine oil and lower alcohol are subjected to ester interchange reaction to obtain a mixture of a fatty acid ester. The mixture is caged with urea to remove saturated fatty acid ester therefrom and thereby to increase the EPA content to 35-40%. Repeating distillation gives high purity EPA esters.

Subsequently, the desired glycerides of EFA are prepared by ester interchange reaction between triglycerides of higher fatty acids, e.g., beef tallow, palm oil and hardened palm oil, and high purity lower alkyl esters of EFA in the presence of nitrogen containing strong organic bases (diazabicycloundecene, etc.), strong basic resins (Amberlist A-26 ®, Organo Co.), or alkali metal alcolates, e.g., sodium methylate, etc. The triglyceride of higher fatty acid and high purity lower alkyl ester of EPA are charged in a mole proportion of 1:1-5 in a reactor, 1-5% by weight, based on the starting materials, of sodium methylate is added to the reactor, and the mixture is heated and stirred to allow the reaction to proceed. The reaction temperature is 60°-200° C., preferably 80°-100° C., and the reaction time is 0.5-10 hours, preferably 1-3 hours. The reaction mixture is charged with water to stop the reaction. In order to prevent oxidation of EPA, the reaction and operations are preferably carried out in an atmosphere of inert gas such as nitrogen.

Subsequently, the reaction liquid is neutralized with an acid, if necessary, and shaken with addition of water and optionally an organic solvent such as ethyl acetate and separated into two layers. The aqueous layer is removed and the organic layer is further washed with water. The organic layer is collected and the solvent if used is distilled off under reduced pressure to obtain a pale brown oily product containing transparent EPA.

The oily productt is decolored, if necessary, with 1-2% by weight of activated clay. The decolored oil contains unreacted and resulted lower alkyl ester of EPA and hence is distilled for 60 minutes at a temperature of 190°-220° C. and a degree of vacuum of 3-5 Torr. After the distillation, the oil is again steam distilled for 60 minutes by blowing 3-5% of steam at blowing temperature of 190°-220° C. at a degree of vacuum of 3-5 Torr. The oily product obtained by &he distillation is diglyceride which contains triglycerides of higher fatty acid containing EPA and di-glycerides of higher fatty acid containing a slight amount of EPA.

According &o the present invention, there is further provided fat and oil products containing glycerides of EPA obtained by the invention. The glycerides of EPA in the present invention starting from glycerides of higher fatty acids are high in melting point and hence fat and oil products containing such EPA glycerides are susceptible to solidification. Furthermore, when using the starting glycerides, the higher fatty acids other than EPA of which are saturated fatty acids, there are prepared fat and oil products having higher melting point. Fat and oil products aimed at in the present invention include margarine, shortening, mayonnaise, butter, dressing, edible oil and the like. Particularly preferred are margarine and shortening.

As shown in the definition of glycerides represented by the above formula, it is contemplated in the present invention that the glycerides of the formula wherein at least one of $R_1$, $R_2$ and $R_3$ represents eicosapentaenoyl group and the other represents an acyl radical of higher fatty acids including docosahexaenoic acid are incorporated in the oil and fat products to achieve the desired object. In addition, the triglycerides of docosahexaenoic acid which is hereafter abbreviated as "DHA" may be incorporated in the oil and fat products.

Still further, there may be incorporated in the oil and fat products the present EPA glycerides and EPA lower alkyl esters for ester interchange used in the preparation of the present EPA glycerides. Such fat and oil products containing the EPA lower alkyl esters have lower melting point than those not containing said esters and hence they are preferably applicable to dressing and edible oils.

To further illustrate this invention, and not by way of limitation, the following examples are given.

Example 1

In the usual way, a purified sardine oil and ethyl alcohol were subjected to ester interchange reaction in the presence of concentrated sulfuric acid catalyst, followed by purification. The EPA ethyl ester (500 g) of 70% purity as obtained was mixed with palm oil (500 g), and the mixture and sodium methylate (10 g) were charged in a 1000 ml four-necke flask which was then purged with nitrogen gas. Thereafter, the reaction was conducted at 90° C. with stirring for 30 minutes.

After the completion of the reaction, the catalyst was deactivated with the addition of water, and the mixture was washed three times with water of two times the volume of the mixture to prepare 957 g of a pale brown and transparent oily product.

Subsequently, the oily product was charged with 2% by weight of activated clay and decolorized for 30 minutes under reduced pressure at a temperature of 100° C. to obtain 912 g of a filtered oily product.

The filtered oily product was distilled for 60 minutes at a temperature of 200° C. and a degree of vacuum of 5 Torr. Steam deodorization with 3% steam blowing for 60 minutes gave 430 g of distillate and 430 g of a pale yellow oily product. 1 g of the oily product was dissolved in 5 ml of hexane to investigate the glyceride composition by gas chromatography (FID) under the conditions mentioned below. Triglyceride was found to be 94.5% by weight. Simultaneously, the oily product was subjected to ester interchange with methanol to prepare fatty acid methyl ester. In order to examine the fatty acid composition of the fatty acid methyl ester, gas chromatography (FID) assay was carried out under the following conditions. Eicosapentaenoic acid was found to be about 35.5% by weight.

Conditions for Gas Chromatography (FID)

(1) Assay of triglyceride composition

Column: Diasolid ZT (manufactured by Nippon Chromato Ind. Co.,Ltd.)

φ 3 mm × 0.5 m made of stainless steel
Temperature:
Inlet 300° C.
Oven 150°→340° C. (Rise in temp. 10° C./min)
Carrier gas: Nitrogen 80 ml/min
(2) Assay of fatty acid composition
Column: 15% DEGS Chromosorb WAW DMCS mesh 60/80 (manufactured by GasChro Industry Co., Ltd.)
Temperature:
Inlet 235° C.
Oven 195° C.
Carrier gas: Nitrogen 40 ml/min Example 2

5 g of EPA ethyl ester (EPA purity 50.0%), 5.0 g of a purified sardine oil (EPA purity 15.9%) and 0.1 g of powdered sodium methylate were charged into a 50 ml four-necked flask which was then purged with nitrogen gas. Thereafter, the flask was heated with stirring at 90°-100 ° C. for 1 hour.

After the completion of the reaction, the reaction mixture was cooled to room temperature and extracted with ethyl acetate and hot water.

The ethyl acetate phase was washed once with hot water. Distilling off under reduced pressure of ethyl acetate gave 9.02 g of a Yellowish brown oily reaction product.

The reaction product was column chromatographed with a glass column of φ 4.2 cm × 40 cm packed with 200 g of silica gel for chromatography using n-hexane at a flow rate of 16 ml/min. A mixture of ether and n-hexane was used as an eluent, the proportion of ether was successively increased from 2 v/v % up to 10 v/v %. The triglyceride fractions were collected while confirming by thin layer chromatography, and the solvent was distilled off under reduced pressure to yield 4.1 g of a thin layer chromatographically single odorless triglyceride.

Conditions for thin layer chromatography

Using Silica Gel 60 TLC Plate (5721) manufactured by Merck Co.,Ltd., the fractions were developed with n-hexane/ether/acetic acid (80:20:1), and after spraying with 50% sulfuric acid, heated in the usual way to develop color.

For the confirmation of fatty acid composition, the triglyceride obtained by the reaction was subjected to ester interchange reaction with methanol in the usual way to convert into a corresponding fatty acid methyl ester. As the result of gas chromatographic assay of the methyl ester, the EPA content was found to be about 31.5% by weight.

EXAMPLE 3

A mixture of EPA ethyl ester (500 g) of 90% purity and hardened palm oil (m.p. 52° C.) (500 g) was subjected to the same operation as in Example 1 to prepare 450 g of triglyceride, a pale yellow oily product. The acid components of the hardened palm oil comprises lauric, myristic, palmitic, palmitoleic, stearic, oleic and arachic acids. Gas chromatographic assay of the product was conducted under the same conditions as in Example 1. The EPA content in the triglyceride was found to be about 45.5% by weight. The pale yellow oily product did not emit a smell of fish at all immediately after the deodorization and were tasteless and odorless. The acid component of the oily product comprises myristic, palmitic, palmitoleic, stearic, oleic, linoleic, linolenic, parinaric, arachic, gadoleic, arachidonic, eicosapentaenoic and docosahexaenoic acids.

Spread margarine was prepared using a small sized margarine making machine for experimental purposes from a mixture comprising 80.7% by weight of the pale yellow oily product as prepared above, 16.0% by weight of water, 1.0% by weight of table salt and 2.3% by weight of an emulsifier in combination with a flavoring.

COMPARATIVE EXAMPLE 1

For comparison purposes, 70% by weight of a purified fish oil containing 25% EPA and 30% by weight of hardened soybean oil (m.p. 39° C.) were mixed. Using 80.7% by weight of the mixture as a fat and oil component, the same procedure as in Example 3 was repeated to prepare spread margarine. The EPA content in this margarine was found to be about 17.3% by weight.

The spread margarine prepared in Example 3 and that prepared in Comparative Example 1 were individually stored at 5° C. and −25° C. to investigate changes in taste and peroxide value (POV) with the lapse of time.

The results are shown in Table 1. The spread margarine prepared in Example 3 was found satisfactory with respect to both peroxide value (POV) and after smell of fish oil.

TABLE 1

| Change in POV and after smell of fish oil after storage | | | | | | | |
|---|---|---|---|---|---|---|---|
| | 5° C. | | | | 25° C. | | |
| | Example 3 | | Compar. Ex. 1 | | Example 3 | | Compar. Ex. 1 | |
| | POV | smell | POV | smell | POV | smell | POV | smell |
| As prepared | 0.5 | (−) | 0.5 | (−) | 0.5 | (−) | 0.5 | (−) |
| 1 week | 1.1 | (−) | 1.3 | (+) | 0.5 | (−) | 0.7 | (±) |
| 2 weeks | 1.7 | (−) | 2.4 | (++) | 0.7 | (−) | 0.9 | (+) |
| 3 weeks | 1.9 | (−) | 2.9 | (++) | 0.8 | (−) | 1.3 | (++) |
| 4 weeks | 2.3 | (−) | 4.2 | (+++) | 1.0 | (−) | 1.6 | (++) |

In the above able, the smell was rated as follows:

| (−) | No smell of fish |
| (±) | Slight smell of fish |
| (+) | Smell of fish |
| (++) | Strong smell of fish |
| (+++) | Very strong irritating smell of fish oil |

EXAMPLE 4

A mixture of EPA ester (690 g) of 90% purity and rice bran oil (690 g) was subjected to the same operation as in Example 1 to prepare 665 g of an oily triglyceride product. The oily product did not emit a smell of fish at all immediately after the deodorization thereof and was tasteless and odorless. The EPA content in this oily product was found to be about 46.1% by weight. The acid components of the rice bran oil comprises myristic, palmitic, palmitoleic, stearic, oleic, linoleic, linolenic, arachic and gadoleic acids. The acid components of the oily product as prepared above comprises palmitic, palmitoleic, stearic, oleic, linoleic, linolenic, parinaric, arachic, gadoleic, arachidonic, eicosapentaenoic and docosahexaenoic acids.

COMPARATIVE EXAMPLE 2

For comparison purposes, a purified fish oil containing 25% EPA and the oily product prepared in Example 4 were individually encapsulated in a soft capsule to investigate changes in taste and peroxide value (POV) With the lapse of time. The results are shown in Table 2. The oily product prepared in Example 4 was found satisfactory with respect to taste.

TABLE 2

| Change in POV and after smell of fish oil after storage | | | | |
|---|---|---|---|---|
| | Example 4 | | Compar. Ex. 2 | |
| | POV | smell | POV | smell |
| As prepared | 0.3 | (−) | 0.3 | (−) |
| 1 week | 0.3 | (−) | 0.4 | (±) |
| 2 weeks | 0.4 | (−) | 0.4 | (+) |
| 3 weeks | 0.5 | (−) | 0.6 | (+) |
| 4 weeks | 0.5 | (−) | 0.7 | (++) |

EXAMPLE 5

A mixture of DHA ethyl ester (500 g) of 90% purity and hardened beef tallow oil (m.p. 53° C.) (500 g) was subjected to the same operation as in Example 1 to prepare 470 g of a pale yellow oily triglyceride product. Gas chromatographic assay of the triglyceride product was conducted. The DHA content in the triglyceride was found to be about 44.8% by weight. The pale yellow oily product did not emit a smell of fish at all immediately after the deodorization and was tasteless and odorless.

Spread margarine was prepared using a small sized margarine making machine for experimental purpose from a mixture comprising 80.7% by weight of the pale yellow oily product as prepared above, 10.0% by weight of water, 6.0% by weight of fermented milk, 1.0% by weight of table salt and 2.3% by weight of an emulsifier (Myverol 18-85, a trade name of monoglyceride produced by Eastman Kodak Company) in combination with a flavoring. The margarine was found satisfactory with respect of change in taste on standing, and no after smell of fish oil was perceptible even after storage for one month at 5° C. Changes in taste and peroxide value (P.O.V.) with the lapse of time were determined. The results are shown in Table 3.

TABLE 3

| Change in POV and after smell of fish oil after storage | | |
|---|---|---|
| | P.O.V. | Smell |
| As prepared | 0.3 | (−) |
| 1 week | 1.1 | (−) |
| 2 weeks | 1.2 | (−) |
| 3 weeks | 1.2 | (−) |
| 4 weeks | 1.5 | (−) |

EXAMPLE 6

A mixture of DHA ethyl ester (500 g) of 70% purity and soybean oil (500 g) was subjected to the same operation as in Example 1 to prepare 450 g of a pale yellow oil triglyceride product. Gas chromatographic assay of the product was conducted under the same conditions as in Example 1. The OHA content was found to be about 35.3% by weight. The pale yellow oily product did not emit a smell of fish at all immediately after the deodorizing and were tasteless and odorless.

An emulsion type dressing was prepared in the following manner using 30% by weight of the oily product having the docosahexaenoic acid content of about 35.3% as prepared above, 7% by weight of vinegar, 10% by weight of sorbitol solution, 2.5% by weight of a seasoning (1.58 wt % table salt, 0.7 wt % sugar, 0.2 wt % mustard, and 0.1 wt % sodium glutamate), 3.7% by weight of a natural gum (xanthan gum), 0.3% by weight of a stabilizer (RC-N81 AVICEL produced by Asahi Chemical Industry Co., Ltd.), 2.5% by weight of corn starob and 44% by weight of water.

A mixture of the natural gum, stabilizer, corn starch and water was stirred while heating until the resulting mixture became pasty and the sorbitol solution and seasoning were successively added. Subsequently, the oily product having the docosahexaenoic acid content of 35.3% was added dropwise to the mixture to effect emulsification. The emulsified mixture was charged with the vinegar and homogenized with a colloid mill to prepare the desired dressing. For comparison, a dressing was prepared by repeating the same procedure as above but using salad oil (produced by Nisshin Oil Mills, Ltd.) in place of the above-mentioned oily product.

The two dressings as prepared above were compared for their physical properties and taste. As shown in Table 4 the dressing of the present invention was satisfactory and comparable to the comparative dressing.

TABLE 4

| | Present dressing (the oily product used) | Comparative dressing (salad oil used) |
|---|---|---|
| Thermal stability (100° C., 30 min) | Good | Good |
| Shaking stability (Shaken for 30 min at 200 cycles/min) | Good | Good |
| Freezing and defrosting stability (Oil separation was investigated after freezing at −25° C. and then defrosting at room temp.) | Good | Good |
| Viscosity (cps) (Measured over a B type rotary viscometer) | 56000 | 54000 |
| Taste | Favorable (Not perceptible smell of fish) | Favorable |

EXAMPLE 7

A mixture of EPA ethyl ester (500 g) of 70% purity and soybean oil (500 g) was subjected to the same operation as in Example 1 to prepare 450 g of a pale yellow oily triglyceride product. Gas chromatographic assay of the product was conducted under the same conditions as in Example 1. The EPA content was found to be about 36.0%. The pal- yellow oily product did not emit a smell of fish at all immediately after the deodorization and was absolutely tasteless and odorless.

An emulsion type dressing was prepared in the following manner from a mixture comprising 30% by weight of the oily product as prepared above, 7% by weight of vinegar, 10% by weight of sorbitol solution, 2.5% by weight of a seasoning (1.5 wt % table salt, 0.7 wt % sugar, 0.2 wt % mustard, and 0.1wt % sodium glutamate), 3.7% by weight of a natural gum (xanthan gum), 0.3% by weight of a stabilizer (RC-N81 AVICEL produced by Asahi Chemical Industry Co., Ltd.), 2.5% by weight of corn starch and 44% by weight of water.

A mixture of the natural gum, stabilizer, corn starch and water was stirred while heating until the resulting mixture became pasty and, thereafter, the sorbitol solution and seasoning were successively added. Subsequently, the oily product having the EPA content of 36.0% was added dropwise to the mixture to effect emulsification. The emulsified mixture was charged with the vinegar and homogenized with a colloid mill to prepare the desired dressing. For the purpose of comparison, a dressing was prepared by repeating the same procedure as above but using salad oil (produced by Nisshin Oil Mills, Ltd.) in place of the above-mentioned oily product.

The two dressings as prepared above were compared for their physical properties and taste. As shown in Table 5, the dressing of the present invention was comparable to the comparative dressing and satisfactory.

TABLE 5

|  | Present dressing (the oily product used) | Comparative dressing (salad oil used) |
|---|---|---|
| Thermal stability (100° C., 30 min) | Good | Good |
| Shaking stability (Shaken for 30 min at 200 cycles/min) | Good | Good |
| Freezing and defrosting stability (Oil separation was investigated after freezing at −25° C. and then defrosting at room temp.) | Good | Good |
| Viscosity (cps) (Measured over a B type rotary viscometer) | 56000 | 54000 |
| Taste | Favorable (No perceptible smell of fish) | Favorable |

EXAMPLE 8

An emulsion type dressing was prepared in the following manner from a mixture comprising 20% by weight of the oily product as prepared in Example 7, 10% by weight of 90% EPA ethyl ester, 7% by weight of vinegar, 10% by weight of sorbitol solution, 2.5% by weight of a seasoning (1.5 wt % table salt, 0.7 wt % sugar, 0.2 wt % mustard, and 0.1 wt % sodium glutamate), 3.7% by weight of a natural gum (xanthan gum), 0.3% by weight of a stabilizer (RC-N81 AVICEL produced by Asahi Chemical Industry Co., Ltd.), 2.5% by weight of corn starch and 44% by weight of water.

A mixture of the natural gum, stabilizer, corn starch and water was stirred while heating until the resulting mixture became pasty and, thereafter, the sorbitol solution and seasoning were successively added. Subsequently, the oily product having the EPA content of about 86.0% was mixed with 10% by weight of 90% EPA ethyl ester to effect emulsification. The emulsified mixture was charged with the vinegar and homogenized with a colloid mill to prepare the desired dressing. For the purpose of comparison, a dressing was prepared by repeating the same procedure as above but using salad oil (produced by Nisshin Oil Mills, Ltd.) in place of the above-mentioned oily product.

The two dressings as prepared above were compared for their physical properties and taste. As shown in Table 6, the dressing of the present invention was comparable to the comparative dressing and satisfactory.

TABLE 6

|  | Present dressing (the oily product used) | Comparative dressing (salad oil used) |
|---|---|---|
| Thermal stability (100° C., 30 min) | Good | Good |
| Shaking stability (shaken for 30 min. at 200 cycles/min.) | Good | Good |
| Freezing and defrosting stability (Oil separation was investigated after freezing at −25° C. and then defrosting at room temp.) | Good | Good |
| Viscosity (cps) (Measured with a B type rotary viscometer) | 53000 | 54000 |
| Taste | Favorable (No perceptible smell of fish) | Favorable |

What is claimed is:

1. A product selected from the group consisting of margarine, shortening, mayonnaise, butter, dressing and edible oil, which comprises a glyceride of eicosapentaenoic acid represented by the formula

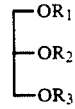

wherein R1, R2 and R3, which are the same or different, each represent eicosapentaenoyl group or an acyl radical of higher fatty acids other than eicosapentaenoic acid, provided that either one of $R_1$, $R_2$ and $R_3$ represents eicosapentaenoyl group and the remaining groups are all an acyl radical of higher fatty acids other that eicosapentaenoic acid.

2. The product of claim 1 which further comprises a lower alkyl ester of eicosapentaenoic acid.

3. A product selected from the group consisting of margarine, shortening, mayonnaise, butter, dressing and edible oil which comprises a triglyceride of docosahexaenoic acid.

* * * * *